(12) United States Patent
Huang et al.

(10) Patent No.: US 9,234,990 B2
(45) Date of Patent: Jan. 12, 2016

(54) EXPOSED LENS RETROREFLECTIVE ARTICLE

(71) Applicant: 3M INNOVATIVE PROPERTIES COMPANY, St. Paul, MN (US)

(72) Inventors: Ningyong Huang, Shanghai (CN); Shane M. Klundt, Hudson, WI (US); Huijin Li, Shanghai (CN); Loretta L. Lucas, Woodbury, MN (US); Bradley R. Ray, Woodbury, MN (US); Rong Wu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/489,655

(22) Filed: Sep. 18, 2014

(65) Prior Publication Data

US 2015/0015955 A1    Jan. 15, 2015

Related U.S. Application Data

(63) Continuation of application No. 13/114,573, filed on May 24, 2011, now Pat. No. 8,851,688.

(30) Foreign Application Priority Data

May 25, 2010    (WO) ................ PCT/CN2010/073217

(51) Int. Cl.
*G02B 5/13*    (2006.01)
*B44C 1/17*    (2006.01)
*B44F 1/02*    (2006.01)
*G02B 5/128*   (2006.01)
*B05D 5/06*    (2006.01)
*G02B 1/10*    (2015.01)

(52) U.S. Cl.
CPC    *G02B 5/13* (2013.01); *B05D 5/063* (2013.01); *B44C 1/1712* (2013.01); *B44F 1/02* (2013.01); *G02B 1/10* (2013.01); *G02B 5/128* (2013.01)

(58) Field of Classification Search
USPC .................................................. 359/515–553
See application file for complete search history.

(56) References Cited

U.S. PATENT DOCUMENTS

| | | |
|---|---|---|
| 3,294,559 A | 12/1966 | Searight et al. |
| 3,700,305 A | 10/1972 | Bingham |
| 3,758,192 A | 9/1973 | Bingham |
| 3,830,682 A | 8/1974 | Rowland |
| 4,025,159 A | 5/1977 | McGrath |

(Continued)

FOREIGN PATENT DOCUMENTS

| | | |
|---|---|---|
| CN | 1240029 A | 12/1999 |
| CN | 1867956 A | 11/2006 |

(Continued)

OTHER PUBLICATIONS

International Application No. PCT/CN2010/073217 Search Report dated Mar. 10, 2011.

*Primary Examiner* — Jennifer L. Doak
(74) *Attorney, Agent, or Firm* — Nicole J. Einerson

(57) ABSTRACT

An exposed lens retroreflective article that includes a binder layer; a layer of spaced apart optical elements that are partially embedded in the binder layer; a penetrated colored layer that is located between the spaced apart optical elements; and a reflective layer that is located functionally behind the layer of optical elements and the penetrated colored layer.

20 Claims, 6 Drawing Sheets

(56) References Cited

U.S. PATENT DOCUMENTS

| | | |
|---|---|---|
| 4,102,562 A | 7/1978 | Harper et al. |
| 4,533,592 A | 8/1985 | Bingham |
| 4,763,985 A | 8/1988 | Bingham |
| 4,896,943 A | 1/1990 | Tolliver et al. |
| 4,897,136 A | 1/1990 | Bailey et al. |
| 5,069,964 A | 12/1991 | Tolliver et al. |
| 5,128,804 A | 7/1992 | Lightle et al. |
| 5,200,262 A | 4/1993 | Li |
| 5,286,682 A | 2/1994 | Jacobs et al. |
| 5,344,705 A | 9/1994 | Olsen |
| 5,378,520 A | 1/1995 | Nagaoka et al. |
| 5,387,458 A | 2/1995 | Pavelka et al. |
| 5,503,906 A | 4/1996 | Olsen |
| 5,510,178 A | 4/1996 | Olsen et al. |
| 5,612,119 A | 3/1997 | Olsen et al. |
| 5,620,613 A | 4/1997 | Olsen |
| 5,645,938 A | 7/1997 | Crandall |
| 5,673,148 A | 9/1997 | Morris |
| 5,679,198 A | 10/1997 | Olsen et al. |
| 5,695,853 A | 12/1997 | Billingsley et al. |
| 5,785,790 A | 7/1998 | Olsen et al. |
| 5,962,121 A | 10/1999 | Mori |
| 5,976,669 A | 11/1999 | Fleming |
| 6,153,128 A | 11/2000 | Lightle et al. |
| 6,172,810 B1 | 1/2001 | Fleming et al. |
| 6,361,850 B1 | 3/2002 | Billingsley et al. |
| 6,416,856 B1 | 7/2002 | Crandall |
| 7,303,292 B2 | 12/2007 | Yukawa et al. |
| 2002/0037364 A1 | 3/2002 | Fleming |
| 2003/0086141 A1 | 5/2003 | Glaser-Inbari et al. |
| 2004/0233526 A1 | 11/2004 | Kaminsky |
| 2005/0162742 A1 | 7/2005 | Fleming et al. |
| 2006/0188700 A1 | 8/2006 | Yukawa et al. |
| 2009/0097114 A1 | 4/2009 | Mimura et al. |

FOREIGN PATENT DOCUMENTS

| | | |
|---|---|---|
| GB | 1447585 | 8/1976 |
| JP | 62-62301 | 3/1987 |
| JP | 62062301 | 3/1987 |
| JP | 3225118 B2 | 11/2001 |
| JP | 2004-054147 | 2/2004 |
| JP | 2005-165302 | 6/2005 |
| WO | WO 95/31739 | 11/1995 |
| WO | WO 96/16343 | 5/1996 |
| WO | WO 97/15848 | 5/1997 |
| WO | WO 98/28642 | 7/1998 |
| WO | WO 01/17773 | 3/2001 |
| WO | WO 2005/106541 A1 | 11/2005 |
| WO | WO 2006/109880 A1 | 10/2006 |
| WO | WO 2007-046157 | 4/2007 |

EXPOSED LENS RETROREFLECTIVE ARTICLE

CROSS-REFERENCE TO RELATED APPLICATIONS

This is a continuation of U.S. application Ser. No. 13/114,573, filed May 24, 2011, which claims priority to International Application No. PCT/CN2010/073217, filed May 25, 2010, the disclosures of which are incorporated herein by reference in their entirety.

FIELD

The present disclosure relates to an exposed lens retroreflective article that includes a colored layer between the lenses and a reflective layer behind the lenses.

BACKGROUND

Persons who work or exercise near motor vehicle traffic can be made safer by wearing clothing that highlights the person's presence to passing motor vehicles. To promote the safety of roadway workers and pedestrians, clothing manufacturers commonly produce bright clothing to make the wearer more conspicuous. Manufacturers also routinely secure retroreflective articles to the outer surface of the clothing to improve wearer conspicuity. Retroreflective articles are passive devices that return incident light back toward the light source. The articles highlight a person's presence to motorists at nighttime by reflecting light from the motor vehicles' headlamps back to the motor vehicle driver. The bright image displayed by the retroreflective article ultimately gives motorists more time to react to the person's presence.

Originally, retroreflective materials were generally all silver in color. As the need arose for retroreflective articles that were colored other than silver, the retroreflective nature of the articles suffered. Therefore, there remains a need for colored retroreflective articles that have increased retroreflective properties.

BRIEF SUMMARY

Disclosed herein is an exposed lens retroreflective article that includes a binder layer; a layer of spaced apart optical elements that are partially embedded in the binder layer; a penetrated colored layer that is located between the spaced apart optical elements; and a reflective layer that is located functionally behind the layer of optical elements and the penetrated colored layer.

Also disclosed is a transfer article that includes an exposed lens retroreflective article that includes a binder layer; a layer of spaced apart optical elements that are partially embedded in the binder layer; a penetrated colored layer that is located between the spaced apart optical elements; and a reflective layer that is located functionally behind the layer of optical elements and the penetrated colored layer; and a carrier web into which the layer of optical elements is partially embedded.

Disclosed herein is an exposed lens retroreflective article that includes a binder layer; a layer of spaced apart optical elements that is partially embedded in the binder layer; a colored layer that is located between the spaced apart optical elements, wherein the colored layer comprises nanopigment; and a reflective layer that is located functionally behind the layer of optical elements and the penetrated colored layer.

Also disclosed is a transfer article that includes an exposed lens retroreflective article that includes a binder layer; a layer of spaced apart optical elements that is partially embedded in the binder layer; a colored layer that is located between the spaced apart optical elements, wherein the colored layer comprises nanopigment; and a reflective layer that is located functionally behind the layer of optical elements and the penetrated colored layer; and a carrier web into which the layer of optical elements is partially embedded.

Also disclosed is a method of making an exposed lens retroreflective article that includes the steps of partially embedding a plurality of optical elements in a carrier web; applying a color composition to the exposed surfaces of the optical elements, wherein the color composition includes pigment having an average size from about 1 nm to about 1000 nm; at least one polymer; and a low flash point solvent; applying a reflective material to the exposed surfaces of the optical elements and the applied color composition; and applying a binder composition to form a binder layer.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawing that forms a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Disclosed herein are retroreflective articles. Embodiments of disclosed retroreflective articles can offer advantages because they are colored but still offer high reflectivities. Disclosed retroreflective articles can offer such advantages because of the combination of partially embedded optical elements and a penetrated colored layer positioned between the partially embedded optical elements. Disclosed retroreflective articles can also pass various standard brightness tests, such as EN471 and ANSI 107 for example. Disclosed retroreflective articles can also have good color chroma. "Good color chroma" can refer to the color coating have less dark or black tones which can be caused by the color of a vapor coated metal reflective layer (vapor coated metal reflective layers such as Al or Ag generally appear as a gray color). Disclosed retroreflective articles can also have less angle of observation dependent difference in color (for example less difference from a vertical angle or less difference when squinting).

Figure 1A:
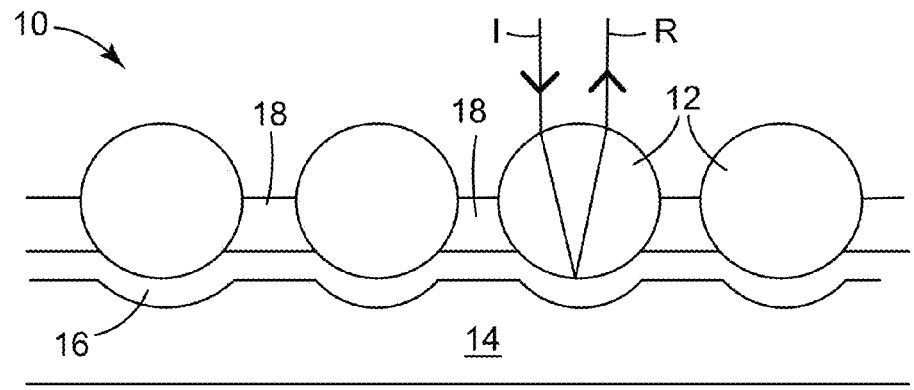
FIG. 1A is a cross-sectional view of an exposed lens retroreflective article as disclosed herein.

An exemplary retroreflective article is schematically depicted in FIG. 1A. The retroreflective article 10 depicted in FIG. 1A includes optical elements 12. The optical elements 12 can generally be spaced apart. The phrase spaced apart, as used herein means that the optical elements 12 are not touching each other and a void or space remains between each optical element 12 and the next optical element 12. The optical elements 12 are partially embedded in or supported by the binder layer 14. The optical elements 12 can be described as being present as a layer of optical elements 12.

Figure 1B:
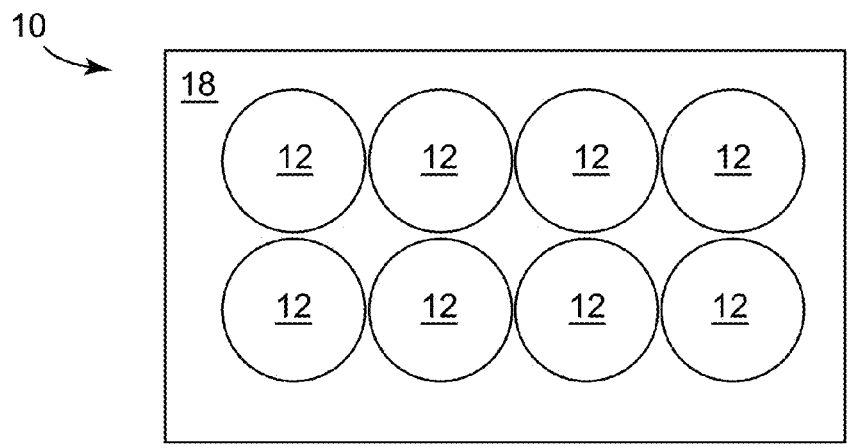
FIG. 1B is a top down view of the exposed lens retroreflective article of FIG. 1A.

The retroreflective article 10 also includes a colored layer 18. The colored layer 18 can be described as being penetrated by the optical elements 12. FIG. 1B shows a top down view of the article of FIG. 1A. As seen there, the colored layer 18 is penetrated by the optical elements 12. The colored layer 18 is located at least between the spaced apart optical elements 12. As seen in both FIGS. 1A and 1B, a portion of each optical element 12 extends beyond the colored layer 18 and is exposed.

The retroreflective article 10 also includes a reflective layer 16. The reflective layer 16 is positioned between the colored layer 18 and the optical elements 12 and the binder layer 14. The position of the reflective layer 16 can also be described as being bound by the colored layer 18 and the optical elements 12 on one surface and the binder layer 14 on the opposing surface. The reflective layer 16 can also be described as being located functionally behind the optical elements 12 and the penetrated colored layer 18 and functionally in front of the binder layer 14. The reflective layer 16 need not be present on the entirety of the article. In embodiments, one or a plurality of regions on the article need not have the reflective layer 16. Such an embodiment will have regions of the article that are not reflective and regions of the article that are reflective; the reflective layer can be patterned. The reflective and non-reflective regions of an article can be utilized for example to form indicia as desired.

The optical elements 12 and the reflective layer 16 operate together to return a substantial quantity of incident light back towards the source of the incident light. Incident light I that strikes the front surface of the retroreflective article 10 passes sequentially through the optical elements 12 to be reflected by the reflective layer 16 to again enter the optical element 12, where the light's direction is then altered to return toward the light source as denoted by beam R.

Figure 1C:
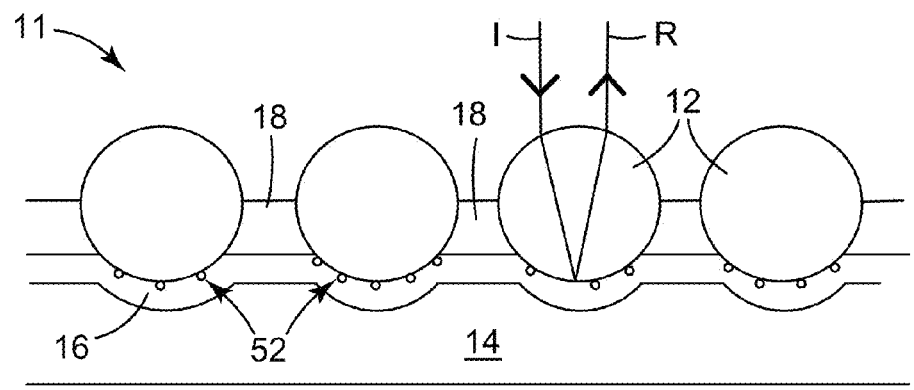
FIG. 1C is a cross-sectional view of an exposed lens retroreflective article as disclosed herein.

FIG. 1C shows another exemplary embodiment of a disclosed article. The article 11 can also include pigment clusters 52 that can be present on the surface of the optical elements between the optical element 12 and the reflective layer 16. The pigment clusters 52 are not drawn to scale, and no assumptions regarding the size or relative distribution of the pigment clusters should be assumed. The pigment clusters 52 that can be present on the optical elements 12 can generally be unevenly distributed across the back surface of the optical element 12. In embodiments, not all optical elements have pigment clusters on the surface thereof. In embodiments, at least one optical element has at least one pigment cluster on the surface thereof. In embodiments, a substantial amount of the optical elements have at least one pigment cluster on the surface thereof. The pigment clusters 52 on the back surface of the optical element 12 can be characterized as an extension of the colored layer 18. If such characterization is utilized, the pigment clusters 52 can be characterized as a discontinuous extension of the colored layer 18. Alternatively, the pigment clusters 52 can be characterized as being part of the colored layer 18 that are penetrated by the optical elements 12.

The presence of the pigment 52 on the back surface of the optical elements 12 can, but need not, be due to the way in which the article was made. Therefore, the amount of pigment 52 that may be present on the back surface of the optical element 12 can be controlled or modified based on various processing conditions. The presence of the pigment 52 on the back surface of the optical elements can form a visibly matte surface when the article is viewed (through a microscope). The pigment 52 can also decrease the dependence of the color on the viewing angle.

Figure 1D:
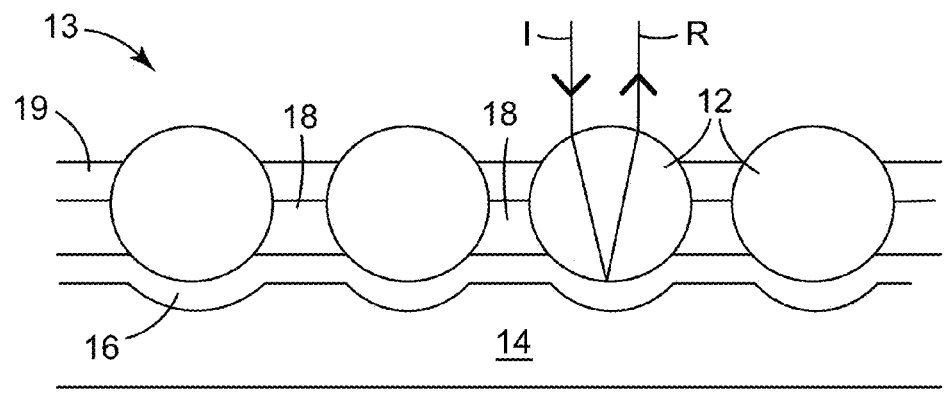
FIG. 1D is a cross-sectional view of an exposed lens retroreflective article that includes an optional clear layer disposed on the colored layer as disclosed herein.

Another embodiment of a disclosed article is depicted in FIG. 1D. The article 13 depicted in FIG. 1D includes components similar to those of FIGS. 1A through 1C, which are numbered similarly. Although not depicted in FIG. 1D, it should also be noted that the exemplary article 13 can include pigment clusters similar to pigment clusters 52 shown in FIG. 1C. The article 13 includes an optional clear layer 19. Optional clear layer 19 (or multiple clear layers) may have any useful thicknesses. In embodiments, a clear layer may be from about 0.01 um to about 20 um thick. The clear layer 19 can be a continuous layer, may be discontinuous (for example, penetrated by the optical elements), or a combination thereof.

As seen in this exemplary article, the clear layer 19 is disposed on the colored layer 18. The optional clear layer 19 can generally function to increase or enhance the durability of the articles. The clear layer 19 depicted in FIG. 1D (located on the colored layer 18 or with respect to FIG. 4, between the colored layer 18 and optical elements 12 and the heat softenable polymer layer 34) can also function to maintain the optical elements in the article when the color composition is applied to form the colored layer. In embodiments, the optional clear layer 19 can be coated using methods similar to those above (e.g., spray coating methods). The optional clear layer 19 can be made of polymeric materials. Specific polymeric materials can include for example polymers such as those utilized in the colored layer.

Figure 1E:
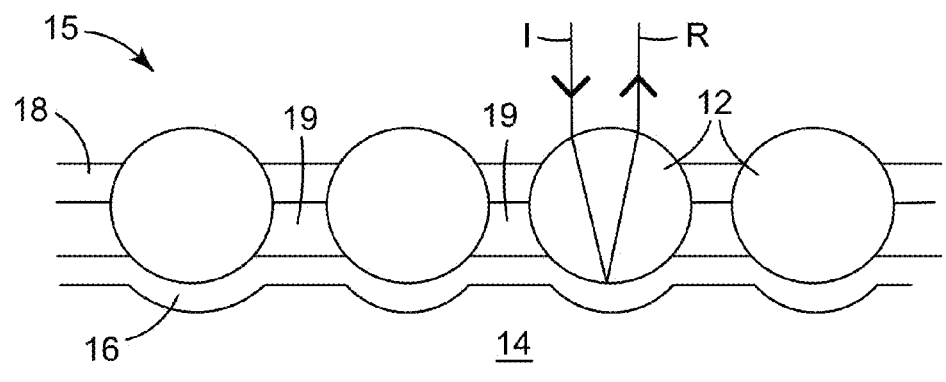
FIG. 1E is a cross-sectional view of an exposed lens retroreflective article that includes an optional clear layer disposed between the colored layer and the reflective layer as disclosed herein.

FIG. 1E depicts another exemplary article 15. The article 15 can include components similar to those depicted in the articles shown in FIG. 1A through 1D (including components similar to pigment clusters 52 even though not depicted in FIG. 1E). The article 15 differs from the article 13 in that the clear layer 19 is disposed between the colored layer 18 and the reflective layer 16 instead of on the colored layer 18. The optional clear layer 19 can provide functionality as discussed above and can be made from the same components as those discussed above.

Figure 1F:
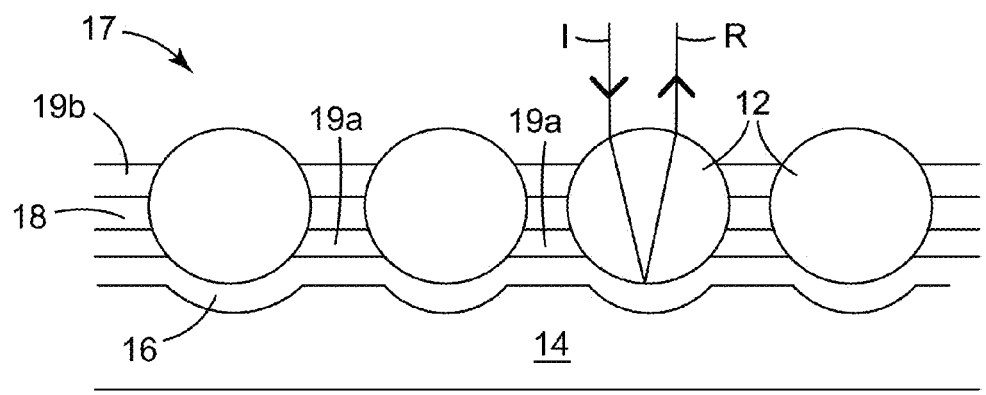
FIG. 1F is a cross-sectional view of an exposed lens retroreflective article that includes two optional clear layers as disclosed herein.

FIG. 1F depicts yet another exemplary article 17. Article 17 can include components similar to those depicted in the articles shown in FIG. 1A through 1E (including components similar to pigment clusters 52 even though not depicted in FIG. 1F). The article 17 differs from the articles 13 and 15 in that there are two clear layers 19a and 19b. The colored layer 18 is generally disposed between the two clear layers 19a and 19b. The optional clear layers 19a and 19b can provide functionality as discussed above and can be made from the same components as those discussed above. The clear layers 19a and 19b may or may not be the same thicknesses and may or may not be made from the same materials.

Figure 2:
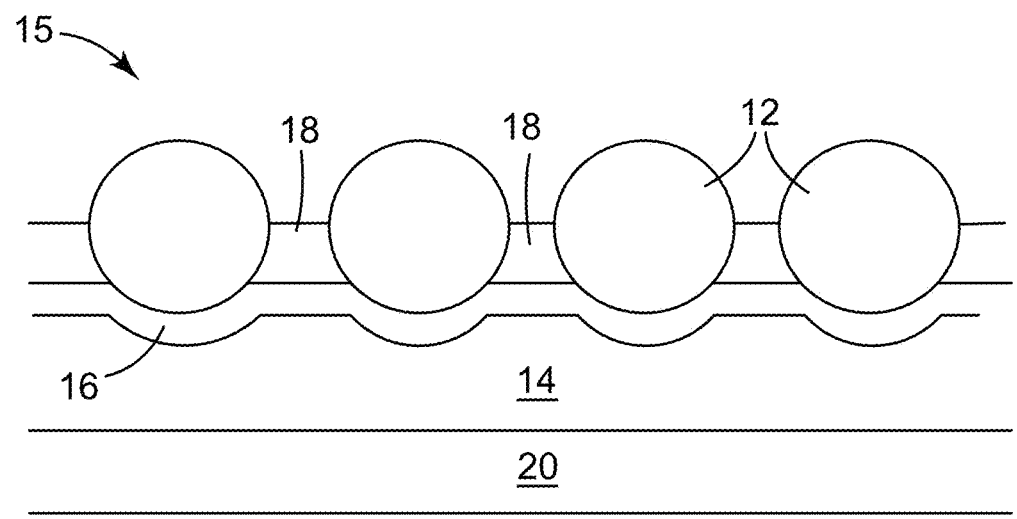
FIG. 2 is a cross-sectional view of an exposed lens retroreflective article that includes a substrate as disclosed herein.

FIG. 2 shows another embodiment of a retroreflective article 15 that optionally includes a substrate 20. The optional substrate 20 can provide the article with enhanced structural integrity. The substrate 20 can be fabric, a film, or scrim, if utilized. If a substrate is utilized, a layer of adhesive may be applied to the substrate 20 to easily adhere the article to an item of interest.

Figure 3:
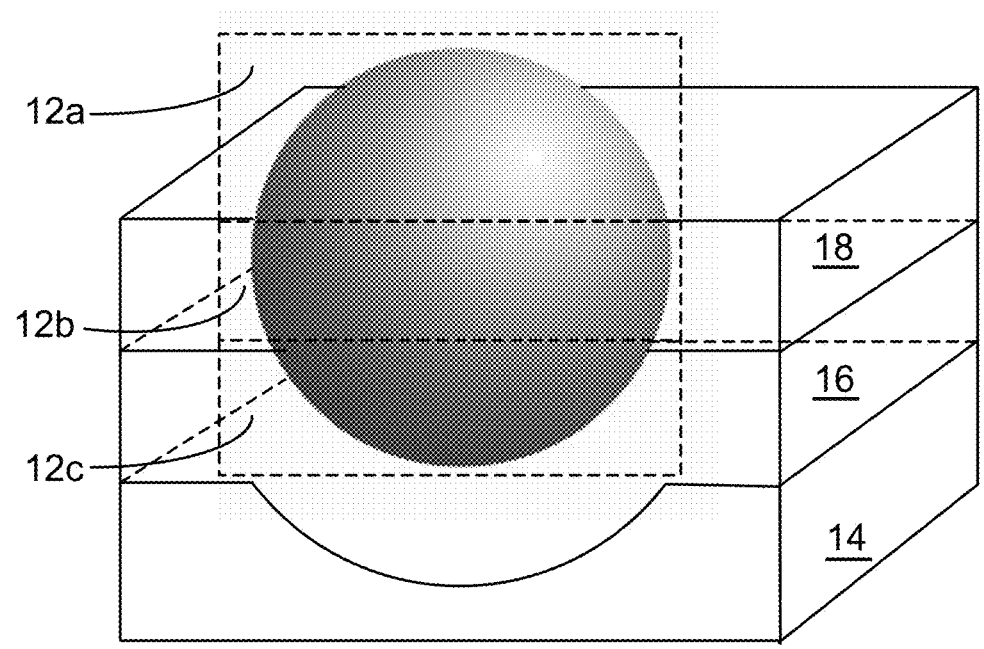
FIG. 3 is a schematic three dimensional view of a portion of an exposed lens retroreflective article as disclosed herein.

As discussed above, the optical elements 12 are partially embedded in the binder layer 14 and penetrate the colored layer 18. Each optical element 12 can be described as having three different regions. These three regions are depicted in FIG. 3. The first region is the exposed region 12a. The exposed region 12a of an optical element is the region above the top surface of the colored layer 18. The second region is the colored contact region 12b. The colored contact region 12b of an optical element is the region that contacts the colored layer 18. The colored contact region 12b can generally be characterized as being below the exposed region 12a. The third region is the reflective contact region 12c. The reflective contact region 12c of an optical element is the region that contacts the reflective layer 16. The reflective contact region 12c can generally be characterized as being below the colored contact region 12b.

The colored contact region 12b can be characterized as having a color contact surface area, which can be the surface area of an optical element 12 that is in contact with the colored layer 18. As the color contact surface area decreases, more space will be available on the back of the optical element from which to reflect light back out through the optical element, thereby increasing the retroreflective nature of the article. The color contact surface area can be characterized by actual values of the surface area, or in relation to the surface area of the entire optical element. In embodiments, the color contact surface area can be from about 0.5% to 75% of the total surface area of the optical element. In embodiments, the color contact surface area can be from about 5% to 50% of the total surface area of the optical element. In embodiments, the color contact surface area can be from about 10% to 45% of the total surface area of the optical element.

The reflective contact region 12c can be characterized as having a reflective contact surface area, which is the surface area of the optical element 12 that is in contact with the reflective layer 16. As the reflective contact surface area decreases, there will be less space on the back of the optical element from which to reflect light back out through the optical element, and the retroreflective nature of the article will decrease. The reflective contact surface area can be characterized by actual values of the surface area, or in relation to the surface area of the entire optical element. In embodiments, the reflective contact surface area can be at from about 0.1% to 75% of the total surface area of the optical element. In embodiments, the reflective contact surface area can be from about 5% to 50% of the total surface area of the optical element. In embodiments, the reflective contact surface area can be from about 10% to 45% of the total surface area of the optical element.

The binder layer can include a polymer and may contain other materials. The binder layer adheres to or is otherwise physically associated with the reflective layer. In embodiments, the binder layer can also adhere to or be otherwise physically associated with an adhesive layer or a backing of some sort (for example, fabric, a film, or scrim). The binder layer is capable of supporting optical elements and is typically a continuous, fluid-impermeable, polymeric, sheet-like layer. Binder layers that are too thin may be too thin to adhere to both a substrate and the optical elements. Binder layers that are too thick may unnecessarily stiffen the article and add to the cost. In embodiments, the binder layer has an average thickness of about 1 to 250 micrometers. In embodiments, the binder layer has an average thickness of about 30 to 150 micrometers.

The binder layer may include polymers that contain units such as urethane, ester, ether, urea, epoxy, carbonate, acrylate, acrylic, olefin, vinyl chloride, amide, alkyd, or combinations thereof. A variety of organic polymer forming reagents can be used to make the polymer. Polyols and isocyanates can be reacted to form polyurethanes; diamines and isocyanates can be reacted to form polyureas; epoxides can be reacted with diamines or diols to form epoxy resins, acrylate monomers or oligomers (it should be noted that any time a monomer is mentioned herein as being utilized, an oligomer can also be utilized) can be polymerized to form polyacrylates; and diacids can be reacted with diols or diamines to form polyesters or polyamides. Examples of commercially available polymer forming reagents that may be used in forming the colored layer include for example: Vitel™ 3550 available from Bostik Inc., Middleton, Mass.; Ebecryl™ 230 available from UBC Radcure, Smryna, Ga., Jeffamine™ T-5000, available from Huntsman Corporation, Houston, Tex.; CAPA 720, available from Solvay Interlox Inc., Houston Tex.; and Acclaim™ 8200, available from Lyondell Chemical Company (formerly Arco Chemical Co.), Houston, Tex. Examples of reactive polymers useful in forming the binder layer include hydroxyalkylenes, polymeric epoxides such as polyalkylene oxides, and copolymers thereof.

The polymer precursor can also include an acrylate monomer or acrylate oligomer as a reactive diluent such that the acrylate monomer polymerizes via free-radical polymerization and the other reactive components such as polyols and isocyanates polymerize via a condensation polymerization. The polymerizations may occur contemporaneously. The reactive diluent allows for a higher solids loading level without the viscosity problems associated with handling higher viscosity solutions. It also eliminates the need for solvent and the problems associated with removing the solvent.

The polymer that is used in the binder layer may have functional groups that allow the polymer to be linked to a silane coupling agent, or the reactants that form the polymer may possess such functionality. For example, in producing polyurethanes, the starting materials may possess hydrogen functionalities that are capable of reacting with an isocyanate-functional silane coupling agent; see, for example, U.S. Pat. No. 5,200,262 to Li.

In embodiments, compositions such as those discussed by Crandall in U.S. Pat. No. 5,645,938 and International Publication WO 96/16343 and by Fleming in U.S. Pat. No. 5,976,669 and PCT published application WO 98/28642.

The binder layer can also optionally include other materials not discussed herein. In embodiments, a binder layer may be made from about, in weight percent, 55% Capa™ 720 (a block copolymer of poly(tetramethylene glycol) and polycaprolactone), 16.4% ethoxylated bisphenol A diol, 4.4% ethoxylated trimethylolpropane, 4.1% isocyanatotriethoxysilane, 20.4% methylene-bis-diphenyl diisocyanate, and catalytic amounts of tertiary amine and dibutyltindilaurate.

Optical elements that can be utilized in retroreflective articles as disclosed herein can include microspheres. In embodiments, the microspheres are substantially spherical in shape to provide uniform and efficient retroreflection. The microspheres can also be highly transparent to minimize light absorption so that a large percentage of incident light is retroreflected. The microspheres are often substantially colorless but may be tinted or colored in some other fashion (see, for example, U.S. Pat. No. 3,294,559 to Searight et al. or U.S. Pat. No. 5,286,682 to Jacobs et al.). The microspheres may be made from glass, a non-vitreous ceramic composition, or a synthetic resin. In embodiments, glass and ceramic microspheres can be utilized because they tend to be harder and more durable than microspheres made from synthetic resins. Examples of microspheres that may be useful in this invention include for example those found in U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

Useful microspheres can have average diameters of about 30 to 200 micrometers, and in embodiments, they can have average diameters of about 50 to 150 micrometers. Microspheres smaller than this range tend to provide lower levels of retroreflection, and microspheres larger than this range may impart an undesirably rough texture to the retroreflective article or may undesirably reduce its flexibility. Useful microspheres can typically have a refractive index of about 1.2 to 3.0, in embodiments about 1.6 to 2.2, and in still other embodiments about 1.7 to 2.0.

The colored layer can include polymer material and pigments. Generally, polymeric materials such as those described above with respect to the binder layer can be utilized. Specific exemplary polyurethane forming methods (into which pigments can be incorporated) are described by Crandall in U.S. Pat. Nos. 5,645,938 and 6,416,856 and PCT published application WO 96/16343, and Fleming in U.S. Pat. No. 5,976,669, and PCT published application WO 98/28642. In embodiments, polyester polyurethanes, polyether polyurethanes, or polyurethanes that include a block copolymer of polyether and polyester units can be utilized in the colored layer. A commercially available polyurethane material that can be utilized in the colored layer includes Bayhydrol® polyurethane dispersions that are available from Bayer AG (Leverkusen, Germany).

A pigment can be any material that is capable of changing the color of reflected or transmitted light as the result of wavelength-selective adsorption. Any colored pigment can be utilized in retroreflective articles as disclosed herein. In embodiments, the pigment can be a nanopigment. A nanopigment is a pigment that generally has an average particle size in the nanometer range. In embodiments, a nanopigment can have an average particle size from about 1 nm to about 1000 nm. Nanopigments can be useful because of the interaction of light with them; light will diffract from nanopigments because of their size, which can contribute to high reflectivities. In embodiments, a nanopigment can have an average particle size from about 50 nm to about 500 nm. An exemplary nanopigment that can be utilized includes Cabojet 300, which is commercially available from Cabot Corporation (Boston, Mass.).

In embodiments, the colored layer can include both nanopigments and other sized pigments (which can be referred to herein as "normal pigments"). Normal pigments can generally have average particle sizes from about 1 μm to about 40 μm. In embodiments, normal pigments can have average particle sizes from about 1 μm (1000 nm) to about 10 μm. In embodiments that include both nanopigments and normal pigments, the nanopigments can account for at least about 5% of the total pigment by weight. In embodiments that include both nanopigments and normal pigments, the nanopigments can account for at least about 10% of the total pigment by weight. In embodiments, the colored layer can include both pigments and dyes. In embodiments, the colored layer can include both nanopigments and dyes for example.

The colored layer can generally include a desirable amount of pigment to provide a desired color or depth of color of the colored layer or article. The amount of pigment in the colored layer can depend at least in part on the particular pigment(s) utilized, the desired color or shade of color, the other components in the colored layer, and combinations thereof. In embodiments, the colored layer can have 0.1 to 70% pigment, by weight of solids in the colored layer; from 1 to 40% pigment, by weight of solids in the colored layer; or from 5 to 35% pigment, by weight of solids in the colored layer.

The colored layer (and the binder layer) can also optionally include other materials not discussed herein. For example, other ingredients such as fillers, stabilizers (for example, thermal stabilizers and antioxidants such as hindered phenols and light stabilizers such as hindered amines or ultraviolet stabilizers), flame retardants, flow modifiers (for example, surfactants such as fluorocarbons or silicones), plasticizers, UV resistant components (for example, UV resistant fillers), and elastomers may be utilized in either or both the colored layer and binder layer. Care should be taken when selecting such additives because some may detrimentally affect laundering durability. For example, high levels of flame retardants such as melamine pyrophosphate may have a deleterious effect on the article's retroreflective performance after laundering.

The colored layer can generally include the pigment dispersed in the polymeric material. Various methods of forming the colored layer from a composition including the pigment and the polymeric material can be utilized to form the colored layer. The methods discussed below offer further discussion regarding specific types of ways of forming the colored layer from a colored layer composition. The colored layer need not be present on the entirety of the article. For example, the color composition can be printed onto the article in order to form some indicia with the regions of the article that appear colored; the colored layer can be patterned. This can be accomplished by printing the color composition onto an article containing the optical elements.

The colored layer can have an average thickness that is less than the average diameter of the optical elements (in the case of spherical optical elements). In embodiments, the colored layer can have an average thickness that is from about 0.0005 to about 0.75 the average diameter of the optical elements. In embodiments, the colored layer can have an average thickness that is from about 0.05 times the average diameter of the optical elements to about 0.5 times the average diameter of the optical elements.

Disclosed articles also include a reflective layer. The reflective layer can generally be a layer of material that has a relatively high light refraction index. In embodiments, the reflective layer is a layer of material with a light refraction index of at least 2.2. In embodiments, the reflective layer can be a specularly reflective layer. In embodiments, the reflective layer can be about 50 to 500 nanometers thick.

In embodiments, the reflective layer can be a metal reflective layer. As used herein, the term "metal reflective layer" refers to a layer that includes elemental metal in pure or alloy form which is capable of reflecting light. The metal may be a continuous coating produced by vacuum deposition, vapor coating, chemical deposition, or electroless plating for example. In embodiments, vapor coating can be used because it is economical, and the vapor deposited coating can have particularly good performance as a reflector. Exemplary metals include for example aluminum (Al), silver (Ag), chromium (Cr), nickel (Ni), magnesium (Mg), gold (Au), tin (Sn), and the like, in elemental form. In embodiments, aluminum and silver can be used because they tend to provide good retroreflective brightness. In the case of aluminum, some of the metal may be in the form of the metal oxide or metal hydroxide.

A variety of non-metallic materials may also be used to provide a reflective layer. Exemplary materials include for example cryolite and $TiO_2$. In embodiments, the reflective layer could include more than one layer of materials. For example, a reflective layer could include a two layer (or more) structure made from zinc sulfate (ZnS) and cryolite, such as that exemplified in GB Patent No. 1447585.

In embodiments, retroreflective articles as disclosed herein can exhibit numerous desirable properties. In embodiments, disclosed retroreflective articles can pass various industry standards for retroreflectiveness. For example, disclosed retroreflective articles can pass American National Standards Institute (ANSI) standards such as ANSI/ISEA 107-1999; ANSI/ISEA 107-2004 (updated version of ANSI/ISEA 107-1999), ANSI/ISEA 207-2006, ANSI/ISEA 107-2010; or European Standards such as EN471 for example.

In embodiments, retroreflective articles as disclosed herein can exhibit retroreflectivity of at least a certain amount when measured using the Retroreflective Brightness procedure described below. In embodiments, retroreflective articles as disclosed herein can exhibit retroreflectivity of at least about 50 candelas/lux/meter$^2$ at 5/0.2 angle when measured using the Retroreflective Brightness procedure described below. In embodiments, retroreflective articles as disclosed herein can exhibit retroreflectivity of at least about 250 candelas/lux/meter$^2$ at 5/0.2 angle when measured using the Retroreflective Brightness procedure described below. In embodiments, retroreflective articles as disclosed herein can exhibit retroreflectivity of at least about 330 candelas/lux/meter$^2$ at 5/0.2 angle when measured using the Retroreflective Brightness procedure described below.

Disclosed retroreflective articles can also exhibit good washing performance, which indicates that they retain at least some portion of their retroreflective properties after being washed. In embodiments, a disclosed retroreflective article can retain at least about 100 candelas/lux/meter$^2$ at 5/0.2 angle after being washed 15 times. In embodiments, a disclosed retroreflective article can retain at least about 200 candelas/lux/meter$^2$ at 5/0.2 angle after being washed 15 times. In embodiments, a disclosed retroreflective article can retain at least about 300 candelas/lux/meter$^2$ at 5/0.2 angle after being washed 15 times.

Figure 4:
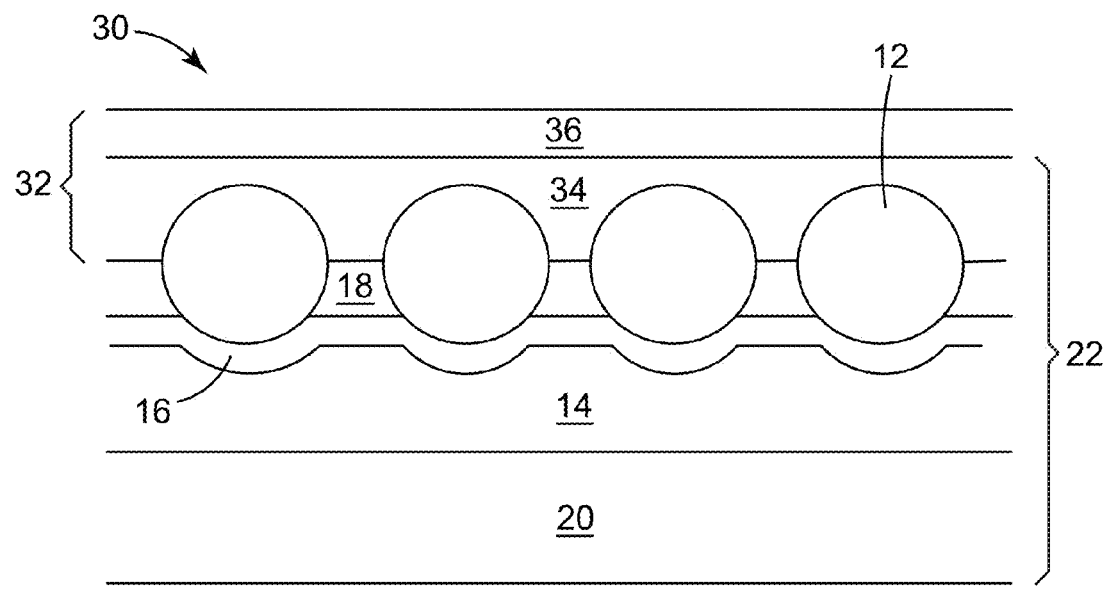
FIG. 4 is a cross-sectional view of a transfer sheet that includes an exposed lens retroreflective article as disclosed herein.

Also disclosed herein are transfer articles. An exemplary transfer article is depicted in FIG. 4. A transfer article 30 can include a retroreflective article 22 that can optionally include a substrate 20 as disclosed with respect to FIG. 2. The transfer article 30 can also include a carrier web 32. The carrier web 32 can include a heat softenable polymer layer 34 on a carrier 36. The carrier 36 can be for example, a paper sheet or a film. Examples of the heat softenable polymer layer 34 can include for example polyvinyl chloride; polyolefins such as polyethylene, polypropylene, and polybutylene; and polyesters. The layer of optical elements 12 can be partially embedded into the heat softenable polymer layer 34 of the carrier web 32.

A retroreflective article or a transfer sheet containing a retroreflective article can be applied to further substrates using mechanical methods such as sewing. In some applications, however, it is desired to secure the article to the substrate by an adhesive layer (not shown). The adhesive layer can be, for example, a pressure-sensitive adhesive, a heat-activated adhesive, or an ultraviolet-radiation-activated adhesive. The substrate bearing the retroreflective article can be located on the outer surface of an article of clothing, enabling the retroreflective article to be displayed when the clothing is worn in its normal orientation on the person. The substrate may be, for example: a woven or nonwoven fabric such as a cotton fabric; a polymeric layer including nylons, olefins, polyesters, cellulosics, urethanes, vinyls, acrylics, rubbers; leather; and the like.

Figure 5:
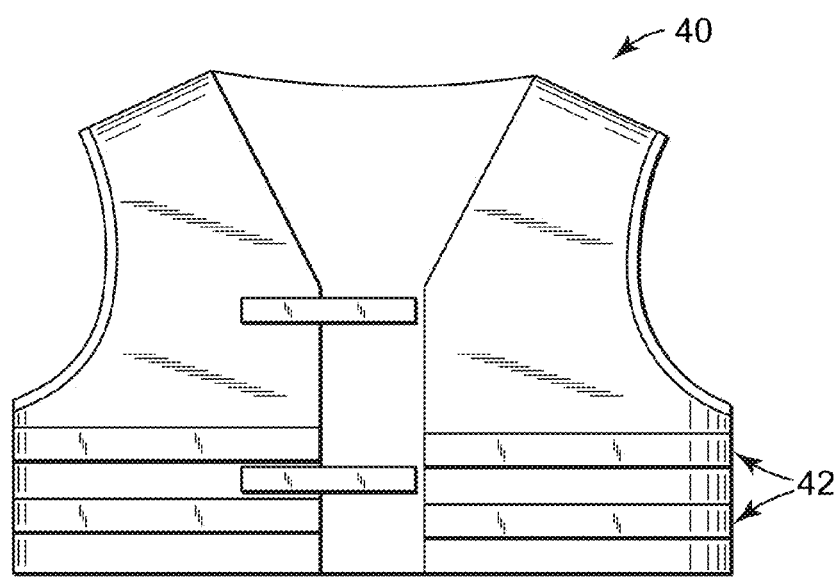
FIG. 5 illustrates an article of clothing that displays a retroreflective article as disclosed herein.

FIG. 5 illustrates a safety vest 40 that displays retroreflective articles 42 that are in the form of an elongated sheeting or strip, typically one to three inches wide. The retroreflective stripes may be bounded by fluorescent stripes as described in U.S. Pat. No. 4,533,592 to Bingham and U.S. Pat. No. 6,153,128 to Lightle et al. Safety vests often are worn by road construction workers to improve their visibility to oncoming motorists. These kinds of vests frequently become dirty and therefore need to be able to withstand harsh cleaning conditions so that the vest can be reused a number of times. Although a safety vest 40 has been chosen for illustration, the article of clothing may come in a variety of forms. As the term is used herein, "article of clothing" means a launderable item of wearing apparel sized and configured to be worn or carried by a person. Other examples of articles of clothing that may display retroreflective articles include shirts, sweaters, jackets (e.g. firefighters' jackets), coats, pants, shoes, socks, gloves, belts, hats, suits, one-piece body garments, bags, and backpacks for example.

Also disclosed herein are methods of making retroreflective articles. The first step in an exemplary method of making a retroreflective article includes partially embedding a plurality of optical elements in a carrier web. Generally, the heat softenable polymer layer retains the optical elements in the desired arrangement. Carrier webs as discussed above can be utilized in disclosed methods. Generally, the optical elements can be partially embedded in the carrier web by commonly utilized methods, such as cascading the optical elements onto the carrier web in a desired temporary arrangement. In embodiments, the optical elements may be arranged in a desired fashion on the carrier web by printing, screening, cascading, or with a hot can roll. For further discussion of applying microspheres to the carrier web, see U.S. Pat. Nos. 4,763,985; 5,128,804; and 5,200,262. The optical elements can be partially embedded in the carrier web to about 30 to 60 percent of the optical element's diameter (assuming a spherical optical element). The portions of the optical elements that are not embedded in the carrier web, the exposed surfaces of the optical elements, protrude from the web so that they can receive the colored layer in the next step.

The method can also include optional steps of conditioning the carrier web or applied optical elements by applying release agents or adhesion promoters to achieve desired release properties. This optional step can be carried out before, after, during or a combination thereof, the optical elements are partially embedded in the carrier web.

The next step in an exemplary method is to apply a color composition to the exposed surfaces of the optical elements. The color composition can include pigment (as discussed above), and at least one polymer or monomer. In embodiments that utilize monomer (instead of polymer), a polymerization initiator can also be included which can cause the monomer to polymerize. For example, UV curable coatings or UV curable inks can be utilized. UV curable coatings (or inks) can include monomers, such as acrylate monomers for example, and one or more photoinitators.

The color composition can also include one or more solvents. In embodiments, the color composition can include a combination of a low flash point solvent and a higher (relative to the low flash point solvent) flash point solvent. Use of such solvent combinations in the color composition can cause less of the color composition to remain on the top of the optical elements after the color composition is applied to the exposed surfaces of the optical elements. Instead, the color composition flows down the exposed surfaces of the optical elements and fills the volume between the optical elements and the carrier web in which they are embedded. This can be advantageous because color composition that remains on the top surfaces of the optical elements can interfere somewhat with the effect of the reflective layer on the backs of the optical elements and decrease the retroreflective nature of the article. Even in embodiments where pigment clusters (such as seen in FIG. 1C) exist, use of nanopigments can reduce the decrease in reflectivity that may be caused by such pigment clusters on the back surfaces of the optical elements.

Embodiments that utilize the combination of a low flash point solvent and a higher flash point solvent can minimize the amount of the color composition (or pigment) that remains on the back surface of the optical elements (as depicted in FIG. 1C). This is thought to be accomplished by the color composition flowing down the exposed surfaces of the optical elements and filling the voids between the optical elements and the binder layer in which they are embedded. The pigment (illustrated as the pigment 52 in FIG. 1C) that remains on the back surfaces of the optical element (which surface can also be referred to as the reflective contact surface 12c, see FIG. 3) can be advantageous in embodiments because it can reduce the color difference that can be seen at vertical viewing angles or a "squinting view".

In embodiments, the difference between the flash point of the two solvents (the low flash point solvent and the higher flash point solvent) can be at least about 10° C. In embodiments, the difference between the flash point of the two solvents can be at least about 30° C. Exemplary solvent combinations include for example ethanol and water; ethyl acetate and toluene; and methyl ethyl ketone and toluene.

In embodiments that utilize a low flash point solvent and a higher flash point solvent, the low flash point solvent can account for about 10% to 95% by weight of the total solvent. In embodiments, the low flash point solvent can account for about 30% to 90% by weight. In embodiments, the low flash point solvent can account for about 50% to 80% by weight.

The color composition can also include a solvent and a polymer that is flowable at room temperature or at temperatures from 20° C. to 80° C. Such a combination can allow color composition to flow down the exposed surfaces of the optical element both before the solvent is flashed off and after (due to the flowable polymer component). This allows the color composition to continue flowing down the exposed surfaces of the optical elements during curing, which can allow a significant portion of the color composition to aggregate between the optical elements instead of remaining on the back surfaces of the optical elements. In such embodiments, the solvent could include, for example, ethyl acetate, methyl ethyl ketone, acetone, toluene, tetrahydrofuran, or dimethyl formamide. In such embodiments, the polymer could include for example, acrylate polymers, epoxy liquids, silicone liquids, or polyols for forming polyurethanes and isocyanates as described above.

The polymer can generally include polymers as discussed above, monomers or oligomers to form the polymers as discussed above, or a combination thereof. In embodiments, more than one specific polymer can be utilized in a color composition. In embodiments, the polymer can be utilized as a dispersion of the polymer in water. In embodiments, the polymer can be utilized as a flowable liquid that has a viscosity of from about 10 to 10,000 centipoise (cps). In embodiments, the polymer can be utilized as a flowable liquid that has a viscosity of from about 10 to 4,000 cps.

Color compositions containing at least pigment, polymer, and a solvent can be made using commonly utilized techniques. In embodiments, color compositions can generally contain from about 0.1 to 70 wt % of pigment (based on solids), in embodiments from 1 to 40 wt % pigment (based on solids), and in embodiments from 5 to 35 wt % pigment (based on solids). In embodiments, color compositions can generally contain from 30 to 99.9 wt % of polymer (based on solids), in embodiments from 60 to 99 wt % polymer (based on solids), and in embodiments from 65 to 95 wt % polymer (based on solids).

The color composition can also optionally include other components including for example, water (which may be added as part of a polymer dispersion or separately), other solvents, crosslinkers, catalysts, defoamers, and surfactants for example. Such other components can generally be used for reasons and in quantities as would be known to one of skill in the art having read this specification.

The color composition can generally be applied to the exposed surfaces of the optical elements using known techniques of applying a liquid. Exemplary methods include for example spray coating, bar coating, and printing. In embodiments, printing methods can be utilized to apply the color composition across less than the entirety of the article, for example to form desired indicia using colored and non-colored regions of the article.

The amount of the color composition applied to the exposed surface of the optical elements can be controlled using known techniques, which can vary depending on the method of application. In embodiments, the quantity of color composition applied to the exposed surface of the optical elements can be controlled by comparing the brightness of the partially embedded optical elements before and after application of the color composition. As the quantity (coating weight) of color composition increases, the brightness of the partially embedded optical elements decreases. This is generally true because as the amount of color composition increases, the surface area of the optical elements that remains exposed decreases. Once partially embedded, the exposed surface area is responsible for the retroreflective nature of the optical elements and therefore the brightness of the optical elements. The change in brightness of the partially embedded optical elements without color composition to once coated with color composition can be utilized to manage the coating weight of the color composition.

In methods where it is desired to monitor, control, or both the coating weight of the color composition, the brightness of the partially embedded optical elements can be evaluated before the color composition is applied. The brightness of the partially embedded optical elements can then be evaluated after at least a portion of the color composition has been applied. The difference in brightness can be utilized to determine whether additional color composition should be applied. In embodiments, this can be an iterative process, where the brightness is tested, more color composition is applied, and the steps are repeated until the desired amount (for example coating weight) of color composition has been applied as determined by the change in brightness. Testing the brightness of uncoated, partially coated, or fully coated partially embedded optical elements can be accomplished using known methods and apparatus' for testing the brightness of retroreflective surfaces.

Disclosed methods also include the step of applying reflective material (as discussed above) to the exposed surfaces of the optical elements and the applied color composition. Once the color composition has been applied and has at least partially filled the voids between the optical elements to form the colored layer, a reflective material can be applied to form the reflective layer. Generally, the reflective material is applied to the surface of the colored layer opposite the carrier web and the exposed surfaces of the optical elements opposite the carrier web. The reflective material can be deposited using techniques known to one of skill in the art, having read this specification. Exemplary techniques include for example chemical vapor deposition (CVD), vacuum deposition, vapor coating, or electroless plating. In embodiments, the reflective material can be applied using vacuum deposition.

After the reflective material has been deposited to form the reflective layer, a next step can include application of a binder composition to form the binder layer. The binder composition can include components as were discussed above and can be applied using methods similar to those for applying the color composition.

Disclosed methods can also include an optional step of mechanically agitating the article once the color composition has been applied (either in whole or in part). Such a step, if undertaken, can cause or aid in the color composition flowing down the exposed surfaces of the optical elements towards the voids between the optical elements. Generally, articles as formed herein are desired to have the colored layer between or surrounding the optical elements but not on the exposed surfaces of the optical elements, as that will eventually be covered by the reflective layer. The optional step of mechanically agitating the article can assist in getting the color composition to exist between the optical elements but not on the exposed surfaces of the optical elements. The step of mechanically agitating the article can also be referred to a as leveling. The step of mechanically agitating can generally be accomplished using techniques known to those of skill in the art, having read this specification.

Disclosed methods can also include an optional step or steps of curing. In embodiments, the binder composition, the color composition, or both can be cured. In embodiments, the binder composition, the color composition, or both can cure without further intervention. In embodiments, curing can be accomplished using heat, radiation treatment, or some combination thereof. In embodiments, the color composition can be partially cured or completely cured before the reflective material is applied. In embodiments, the color composition can be partially cured or completely cured after the reflective material is applied. In embodiments, the binder composition can be partially cured or completely cured once applied. In embodiments, the color composition can be partially cured or completely cured after an optional substrate (see 20 in FIG. 4) is applied to the binder layer on the side opposite the reflective layer. In embodiments, the colored composition and the binder composition can be partially cured or completely cured at the same time or at different times.

EXAMPLES

Materials and Methods

All chemicals utilized herein were utilized as received without purification or further processing unless noted otherwise. The chemicals were obtained as noted below. Ancamine K-54 (catalyst) was obtained from Air Products and Chemicals, Inc. (Allentown, Pa.). Bayhydrol XP2470 (polyurethane dispersion), Bayhydrol® VPLS 2058, Desmodur® 2655 (diisocyanate polymer), Desmodur® NZ1 (hexamethylene diisocyanate (HDI) and isopohorone diisocyanate (IPDI) resin), and Desmophen® (hydroxyl-bearing polyester) were obtained from Bayer MaterialScience LLC (Pittsburgh, Pa.). BiCat® 8108 a bismuth (Bi) catalyst was obtained from Shepherd Chemical Company (Norwood, Ohio). CAB-O-JET® 250C (a cyan pigment dispersion) and CAB-O-JET® 300 (a black pigment dispersion) were obtained from Cabot Corporation (Boston, Mass.). Dow Corning® Z-6011 silane was obtained from Dow Corning, Inc. (Midland, Mich.). Dynasylan® 1122 (silane) was obtained from Evonik Industries AG (Essen, Germany). JColor® 10D (a fluorescent yellow pigment dispersion) and JColor® 12 (a fluorescent red-orange pigment dispersion) were obtained from J Color Chemical Co., Ltd (Hangzhou, China). NeoCryl® CX100 (an azopyridine emulsion) was obtained from DSM NeoResins (Waalwijk, Netherlands). Vitel® 3580 (a polyester solution) was obtained from Bostik Company (Wauwatosa, Wis.).

Analysis Methods

Reflectivities of samples were measured using EN471 or ANSI107-2004. Initial Reflectivities were measured using ASTM E808 & E809. The color was tested using ASTM E1164-9.4. Washing tests were done by following ISO 6330 Method 2A. Color layer distribution analysis was done using a normal optical microscope with a magnification of 200×.

Examples 1 and 2

Paper having a weight of 220 g/m$^2$ was coated (at a coating weight of 20 g/m$^2$) with a layer of polyethylene adhesive. The article that included the paper and the adhesive is an example of the carrier web 32, seen in FIG. 4, which is made up of the paper (carrier 36) and the polyethylene (heat softenable adhesive 34). The adhesive coated paper was pre heated at 165° C.

for about 1 minute, then a quantity of ceramic beads (diameter of about 60 um) were poured thereon to cover the entire surface of the adhesive coated paper. The article was then heated for an additional 2 minutes to allow the beads to sink about half way (about half the diameter of the beads sunk in) into the adhesive to form a layer of beads. The sheet was then cooled to room temperature, and any loose beads were removed with a vacuum. The article at this stage is an example of optical elements 12 embedded in a heat softenable adhesive 34 on a carrier 36.

A cyan color composition (Example 1—Bayhydrol® VPLS 2058 13.83%; CAB-O-JET® 250C 20.22%; Dow Corning Z-6011 0.35%; Desmodur® 2655 0.58%; oleic acid 0.05%; and ethanol 64.98%—the amounts are percents of the total wet weight of the composition) and a black color composition (Example 2—Bayhydrol® VPLS 2058 13.83%; CAB-O-JET® 300 20.22%; Dow Corning Z-6011 0.35%; Desmodur® 2655 0.58%; oleic acid 0.05%; and ethanol 64.98%—the amounts are percents of the total wet weight of the composition) were coated with the coating bar gap set at 55 um (calculated from the bottom of the valley between the beads).

The coated article was then heated to about 65° C. for about 3 minutes. The temperature was then raised to about 90° C. and maintained for about 2 minutes. A colored layer having a weight of about 2 g/m² was formed. The article at this stage is an example of a colored layer 18 between optical elements 12 embedded in a carrier web 32.

Figure 6A:
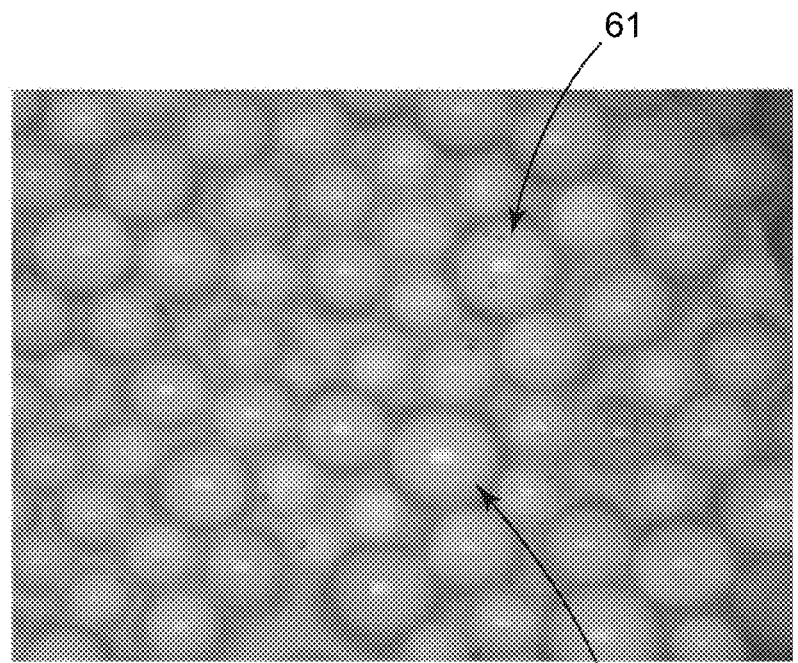
FIG. 6A is an optical micrograph of the reflective surface of optical elements prepared according to Example 1.

The article was observed from the surface of the exposed beads, using an optical microscope at a magnification of 200×. A recorded image from Example 1 can be seen in FIG. 6. As seen in FIG. 6, some of the ceramic beads have pigment clusters on the tops (an exemplary bead with pigment clusters is noted as bead 61) and some do not (an exemplary bead without visible pigment clusters is noted as bead 63).

The samples were then vapor coated with aluminum. The article at this stage is an example of a reflective layer 16 formed on a colored layer 18 between optical elements 12 embedded in a carrier web 32.

After vapor coating, the samples were then coated with a binder composition (Vitel® 3580 87.48%; Desmophen® 670BA 3.82%; BiCat® 8108 0.03%; Dow Corning Z-6011 1.37%; and Desmodur® Z4470 7.30%—the amounts are percents of the total wet weight of the composition) at a solid coating weight of 60 g/m², then cured at 80° C. for about 1 minute, and then moved to an oven at 125° C. for about 2 minutes. The article at this stage is an example of a binder layer 14 disposed on a reflective layer 16 formed on a colored layer 18 between optical elements 12 embedded in a carrier web 32.

The coated samples were then laminated with 80/20 TC fabric at 160° C. for about 30 seconds. The article at this stage is an example of a substrate 20 disposed on a binder layer 14, on a reflective layer 16 formed on a colored layer 18 between optical elements 12 embedded in a carrier web 32. After about 12 hours, the fabric (which can be considered the substrate 20) was stripped off the article and the article was tested.

Figure 6B:
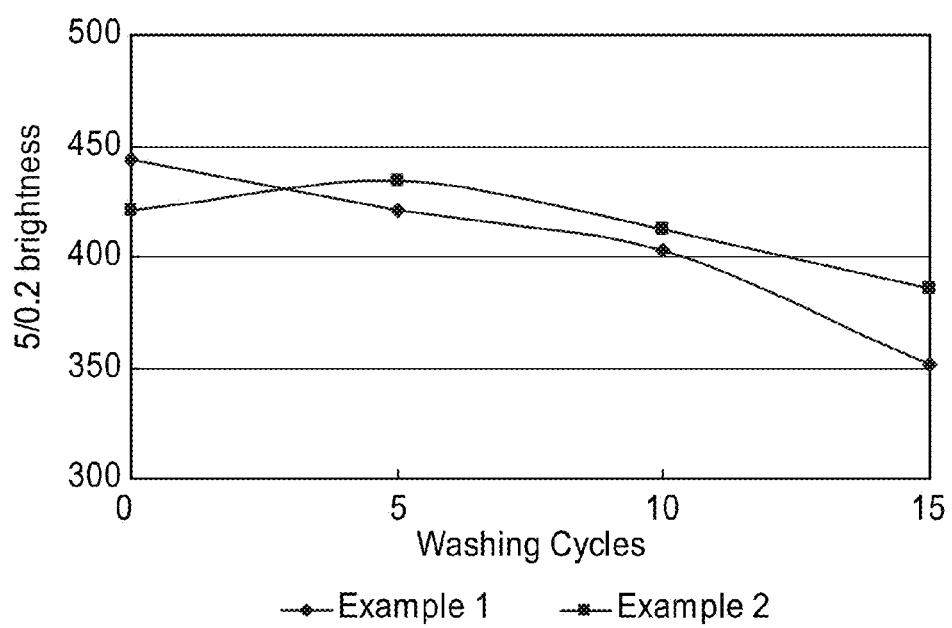
FIG. 6B is a graph depicting the brightness of Examples 1 and 2 after 0, 5, 10, and 15 washing cycles.
Figure 8:
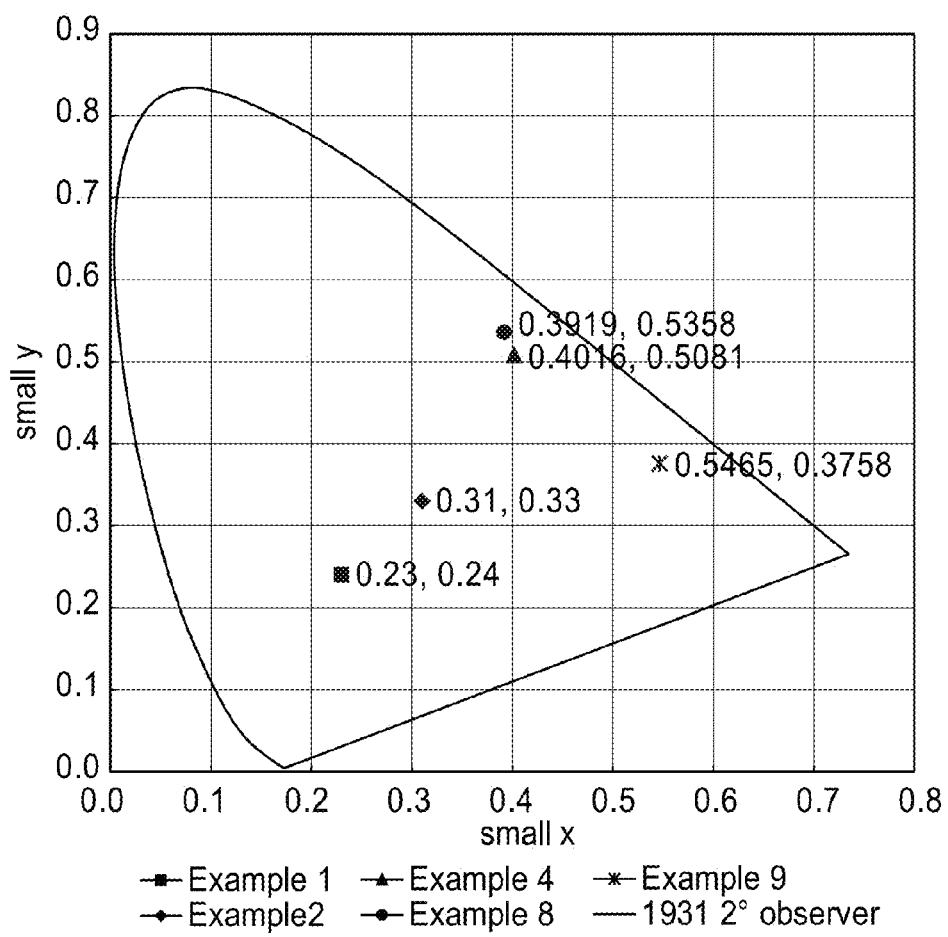
FIG. 8 is a graph depicting color analysis of Examples 2, 4, 8, and 9.

Examples 1 and 2 were tested using EN471 for their reflective brightness at all angles and at an observed angle of 0.02/actual angle of 5 after 0, 5, 10, and 15 washing cycles. The results for all angles can be seen in Table 1 below and the results for the observed angle of 0.2 and an actual angle of 5 after 0, 5, 10, and 15 washing cycles is shown in FIG. 6B. The color of Example 2 was also analyzed using ASTM E1164-9.4 and the color analysis can be seen in FIG. 8.

TABLE 1

| Observed Angle | Actual Angle | EN471 Spec | Example 1 | Example 2 |
|---|---|---|---|---|
| 0.2 | 5 | 330 | 424.54 | 413.18 |
| 0.2 | 20 | 290 | 361.49 | 369.51 |
| 0.2 | 30 | 180 | 281.25 | 275.37 |
| 0.2 | 40 | 65 | 129.92 | 143.89 |
| 0.33 | 5 | 250 | 306.1 | 294.61 |
| 0.33 | 20 | 200 | 262.82 | 269.75 |
| 0.33 | 30 | 170 | 210.34 | 221.26 |
| 0.33 | 40 | 60 | 106.46 | 128.58 |
| 1 | 5 | 25 | 33.5 | 35.87 |
| 1 | 20 | 15 | 30.89 | 33.92 |
| 1 | 30 | 12 | 22.53 | 22.26 |
| 1 | 40 | 10 | 12.97 | 27.63 |
| 1.5 | 5 | 10 | 19.33 | 21.92 |
| 1.5 | 20 | 7 | 17.08 | 21.29 |
| 1.5 | 30 | 5 | 15.07 | 21.85 |
| 1.5 | 40 | 4 | 8.26 | 9.44 |

Examples 3 through 7

Optical elements embedded in a heat softenable polymer on a carrier were made as described in Examples 1 and 2.

Color compositions as seen in Table 2 below were coated on the beads to form colored layers as described in Examples 1 and 2. The coating weight of the color composition was about 10 g/m².

TABLE 2

| | Example 3 % wt in wet formula | Example 4 % wt in wet formula | Example 5 % wt in wet formula | Example 6 % wt in wet formula | Example 7 % wt in wet formula |
|---|---|---|---|---|---|
| J-color JCF10D | 12.05 | 15.01 | 18.07 | 21.06 | 24.15 |
| Desmophen 670 | 9.29 | 7.29 | 5.31 | 3.27 | 1.28 |
| Desmodur NZ1 | 6.67 | 5.34 | 4.05 | 2.71 | 1.39 |
| Dynasylan 1122 | 0.85 | 0.85 | 0.86 | 0.85 | 0.84 |
| Bichat 8108 | 0.01 | 0.01 | 0.01 | 0.01 | 0.01 |
| CX100 | 1.21 | 1.50 | 1.81 | 2.11 | 2.42 |
| Toluene | 34.96 | 35.00 | 34.94 | 34.99 | 34.95 |
| Ethyl acetate | 34.96 | 35.00 | 34.94 | 34.99 | 34.95 |
| total | 100.00 | 100.00 | 100.00 | 100.00 | 100.00 |

Figure 7:
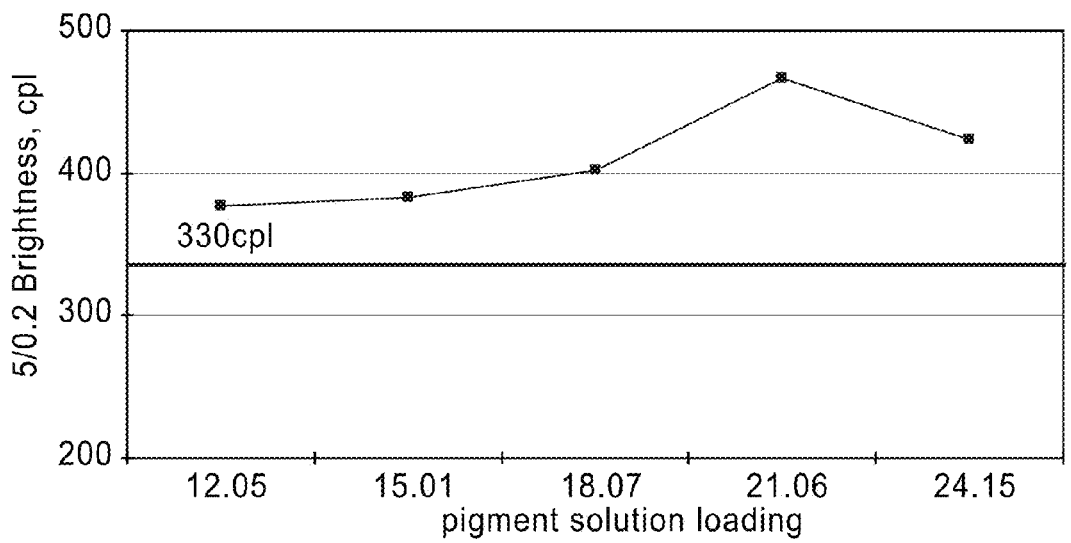
FIG. 7 is a graph depicting the brightness of the articles of Examples 3 through 7 as a function of pigment loading.

An aluminum coating, binder layer, and substrate were formed on the samples as described in Examples 1 and 2. The substrate was removed after 12 hours (as in Examples 1 and 2) and then the samples were tested. Examples 3 through 7 were tested with EN471 at 5/0.2 angles. FIG. 7 shows the brightness at 5/0.2 angles as a function of the pigment loading of the samples. Table 3 shows the brightness at all angles for Example 4. The color of Example 4 was also analyzed using ASTM E1164-9.4 and the color analysis can be seen in FIG. 8.

TABLE 3

| Observed Angle | Actual Angle | EN471 Spec | Example 4 |
|---|---|---|---|
| 0.2 | 5 | 330 | 380.6 |
| 0.2 | 20 | 290 | 364.81 |
| 0.2 | 30 | 180 | 274.98 |
| 0.2 | 40 | 65 | 122.63 |

TABLE 3-continued

| Observed Angle | Actual Angle | EN471 Spec | Example 4 |
|---|---|---|---|
| 0.33 | 5 | 250 | 285.48 |
| 0.33 | 20 | 200 | 268.57 |
| 0.33 | 30 | 170 | 209.52 |
| 0.33 | 40 | 60 | 101.71 |
| 1 | 5 | 25 | 31.88 |
| 1 | 20 | 15 | 31.02 |
| 1 | 30 | 12 | 23 |
| 1 | 40 | 10 | 16.11 |
| 1.5 | 5 | 10 | 17.04 |
| 1.5 | 20 | 7 | 16.6 |
| 1.5 | 30 | 5 | 14.08 |
| 1.5 | 40 | 4 | 9.14 |

Example 8

Optical elements embedded in a heat softenable polymer on a carrier were made as described in Examples 1 and 2. A cyan color composition (JColor® JCF10D 24.06%; Desmophen® 670 7.07%; Desmodur® NZ1 5.40%; BiCat® 8108 0.02%; CX100 2.41%; toluene 29.95%; and ethyl acetate 29.95%—the amounts are percents of the total wet weight of the composition) was coated with the coating bar gap set at 55 um (calculated from the bottom of the valley between the beads). The coated article was then heated to about 65° C. for about 3 minutes to flash off the low flash point solvent (ethanol). The temperature was then raised to about 90° C. and maintained for about 2 minutes. The coating weight of the color composition was about 9 g/m².

A layer of clear polymer solution (Desmophen® XP 2501 3.16%; Desmodur® NZ1 1.73%; Dynasylan® 1122 0.15%; and ethyl acetate 94.96%—the amounts are percents of the total wet weight of the composition) was coated on the exposed surface of the color layer (to provide an article similar to that seen in FIG. 1E) at a coating bar gap set at 55 um (calculated from the bottom of the valley between the beads). The coated article was then heated to about 65° C. for about 3 minutes to flash off the low flash point solvent (ethanol). The temperature was then raised to about 90° C. and maintained for about 2 minutes. A clear layer having a coating weight of about 3 g/m² was formed.

An aluminum coating, binder layer, and substrate were formed on the samples as described in Examples 1 and 2. The substrate was removed after 12 hours (as in Examples 1 and 2) and then the sample was tested with EN471 reflective brightness at all angles. The color was also analyzed using ASTM E1164-9.4. The reflectivity can be seen in Table 4 below; and the color analysis can be seen in FIG. 8.

Example 9

Optical elements embedded in a heat softenable polymer on a carrier were made as described in Examples 1 and 2. A layer of clear polymer solution (Vitel® 3580 9.1%; Desmodur NZ1 0.9%; and ethyl acetate 90.0%—the amounts are percents of the total wet weight of the composition) was coated on the exposed surface of the optical elements with the coating bar gap set at 55 um (calculated from the bottom of the valley between the beads). The coated article was then heated to about 65° C. for about 3 minutes to flash off the low flash point solvent (ethanol). The temperature was then raised to about 90° C. and maintained for about 2 minutes. A clear layer having a coating weight of about 5 g/m² was formed.

A color composition (JColor® JCF12 18.1%; Desmophen® 670BA 5.3%; Desmodur® NZ1 4.1%; CX100 1.8%; and ethyl acetate 69.9%—the amounts are percents of the total wet weight of the composition) was coated with the coating bar gap set at 55 um (calculated from the bottom of the valley between the beads). The coated article was then heated to about 65° C. for about 3 minutes to flash off the low flash point solvent (ethanol). The temperature was then raised to about 90° C. and maintained for about 2 minutes. The coating weight of the color composition was about 8 g/m².

A second layer of clear polymer solution (Vitel® 3580 9.1%; Desmodur NZ1 0.9%; and ethyl acetate 90.0%—the amounts are percents of the total wet weight of the composition) was coated on the exposed surface of the color layer (to provide an article similar to that seen in FIG. 1F) at a coating bar gap set at 55 um (calculated from the bottom of the valley between the beads). The coated article was then heated to about 65° C. for about 3 minutes to flash off the low flash point solvent (ethanol). The temperature was then raised to about 90° C. and maintained for about 2 minutes. A clear layer having a coating weight of about 3 g/m² was formed.

An aluminum coating, binder layer, and substrate were formed on the samples as described in Examples 1 and 2. The substrate was removed after 12 hours (as in Examples 1 and 2) and then the sample was tested with EN471 at all angles. The color was also analyzed using ASTM E1164-9.4. The reflectivity can be seen in Table 4 below; and the color analysis can be seen in FIG. 8.

TABLE 4

| Observed Angle | Actual Angle | EN471 Spec | Example 8 | Example 9 |
|---|---|---|---|---|
| 0.2 | 5 | 330 | 457.06 | 437.64 |
| 0.2 | 20 | 290 | 411.87 | 408.76 |
| 0.2 | 30 | 180 | 260.65 | 255.41 |
| 0.2 | 40 | 65 | 102.04 | 109.17 |
| 0.33 | 5 | 250 | 341.21 | 321.65 |
| 0.33 | 20 | 200 | 313.57 | 292.25 |
| 0.33 | 30 | 170 | 217.81 | 195.12 |
| 0.33 | 40 | 60 | 92.69 | 67.56 |
| 1 | 5 | 25 | 38.31 | 39.5 |
| 1 | 20 | 15 | 39.41 | 45.38 |
| 1 | 30 | 12 | 29.8 | 46.06 |
| 1 | 40 | 10 | 24.2 | 19.42 |
| 1.5 | 5 | 10 | 21.91 | 20.33 |
| 1.5 | 20 | 7 | 20.96 | 21.21 |
| 1.5 | 30 | 5 | 21.8 | 20.77 |
| 1.5 | 40 | 4 | 12.01 | 15.21 |

Thus, embodiments of exposed lens retroreflective articles are disclosed. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. An exposed lens retroreflective article comprising:
    a binder layer;
    a layer of spaced apart optical elements that is partially embedded in the binder layer, wherein each optical element within the layer of optical elements has an embedded portion comprising a back surface;
    a colored layer comprising pigment that is located at least between the spaced apart optical elements; and
    a reflective layer that is located functionally behind the layer of optical elements and the colored layer;
    wherein at least one pigment cluster is present on the back surface of an optical element; and
    wherein the article exhibits a retroreflectivity at 5/0.2 angle of at least about 50 cd/lux/m².

2. The article of claim 1, wherein the colored layer is also at least partially located between the layer of optical elements and the reflective layer and comprises the at least one pigment cluster, and wherein the colored layer has a thickness that is greater between adjacent optical elements than between the layer of optical elements and the reflective layer.

3. The article of claim 1, wherein the colored layer has an average thickness between the spaced apart optical elements ranging from greater than 0.1 times the average diameter of the optical elements to 0.75 times the average diameter of the optical elements.

4. The article of claim 1, wherein the colored layer has a non-uniform thickness.

5. The article of claim 1, wherein the colored layer is non-reflective.

6. The article of claim 1, further comprising a clear layer.

7. The article of claim 5, wherein the clear layer has a thickness of from about 0.01 μm to about 20 μm.

8. The article of claim 5, wherein the clear layer is disposed on the colored layer.

9. The article of claim 5, wherein the clear layer is disposed between the colored layer and the reflective layer.

10. The article of claim 5, wherein the clear layer is disposed in at least one of the following locations:
   on the colored layer, and
   between the colored layer and the reflective layer.

11. The article of claim 1, wherein the binder layer comprises a polymeric material made from a monomeric or oligomeric unit selected from the group consisting of urethane, ester, ether, urea, epoxy, carbonate, acrylate, acrylic, olefin, vinyl chloride, amide, alkyd, and combinations thereof.

12. The article of claim 1, wherein the binder layer has an average thickness of about 30 to 150 μm.

13. The article of claim 1, wherein the pigment comprises a nanopigment.

14. The article of claim 1, wherein the colored layer is at least partially penetrated by the optical elements.

15. The article of claim 1, wherein the article exhibits a retroreflectivity at 5/0.2 angle of at least about 330 cd/lux/m$^2$.

16. The article of claim 1, wherein the article exhibits a retroreflectivity at 5/0.2 angle of at least about 100 cd/lux/m$^2$ after 15 washes.

17. The article of claim 1, wherein the colored layer comprises a fluorescent yellow pigment, and the article exhibits a fluorescent yellow color.

18. The article of claim 1, wherein the colored layer comprises a fluorescent red-orange pigment, and the article exhibits a fluorescent red-orange color.

19. A method of making an exposed lens retroreflective article comprising, the method comprising:
   partially embedding a plurality of optical elements in a carrier web;
   applying a color composition to the exposed surfaces of the optical elements, wherein the color composition comprises:
      pigment having an average size from about 1 nm to about 1000 nm; and
      at least one polymer,
      wherein the color composition is applied to the exposed surfaces of the optical elements to result in at least one pigment cluster being present on an exposed surface of an optical element, such that at least one pigment cluster is present on the back surface of an optical element of the resulting article;
   applying a reflective material to the exposed surfaces of the optical elements and the applied color composition; and
   applying a binder composition to form a binder layer;
   wherein the article exhibits a retroreflectivity at 5/0.2 angle of at least about 100 cd/lux/m$^2$ after 15 washes.

20. An exposed lens retroreflective article comprising:
   a binder layer;
   a layer of spaced apart optical elements that is partially embedded in the binder layer, wherein each optical element within the layer of optical elements has an embedded portion comprising a back surface;
   a colored layer comprising pigment that is located at least between the spaced apart optical elements; and
   a reflective layer that is located functionally behind the layer of optical elements and the colored layer;
   wherein at least one pigment cluster is present on the back surface of an optical element; and
   wherein the article exhibits a retroreflectivity at 5/0.2 angle of at least about 100 cd/lux/m$^2$ after 15 washes.

* * * * *